(12) United States Patent
Raitola

(10) Patent No.: US 6,366,602 B1
(45) Date of Patent: Apr. 2, 2002

(54) METHOD OF GENERATING A CARRIER WAVE OF COMMON CHANNELS, AND A RADIO SYSTEM

(75) Inventor: Mika Raitola, Masala (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/117,700

(22) PCT Filed: Dec. 3, 1997

(86) PCT No.: PCT/FI97/00752

§ 371 Date: Oct. 7, 1998

§ 102(e) Date: Oct. 7, 1998

(87) PCT Pub. No.: WO98/28859

PCT Pub. Date: Jul. 2, 1998

(51) Int. Cl.[7] ................................................. H04L 27/30
(52) U.S. Cl. ......................................... 375/135; 375/132
(58) Field of Search .............................. 375/132, 135, 375/138; 370/321, 337, 347, 464, 470, 473, 475

(56) References Cited

U.S. PATENT DOCUMENTS

| 5,507,018 A | | 4/1996 | Seppala | |
| 5,740,166 A | * | 4/1998 | Ekemark et al. | 370/331 |
| 5,917,812 A | * | 6/1999 | Antonio et al. | 370/337 |

FOREIGN PATENT DOCUMENTS

| EP | 0 275 118 | 7/1988 |
| FI | 97838 | 11/1993 |
| FI | 99182 | 11/1995 |
| WO | WO 95/33313 | 12/1995 |

OTHER PUBLICATIONS

Copy of the International Search Report for PCT/FI97/00752.

* cited by examiner

*Primary Examiner*—Chi Pham
*Assistant Examiner*—Emmanuel Bayard
(74) *Attorney, Agent, or Firm*—Altera Law Group, LLC

(57) ABSTRACT

The invention relates to a method of generating a carrier wave of common channels and a radio system. The radio system comprises a network part, subscriber terminals and a bidirectional transmission path between the network part and the subscriber terminal. The bidirectional transmission path consists of frames to be transmitted at a carrier wave frequency. A frame comprises time slots. To a time slot is applied a channel, the channel being either a common channel (FCCH, SCH, BCCH, CCCH) or a dedicated channel (TCH). The carrier wave is generated by adjusting transmission powers of time slots and by using frequency hopping to the effect that first there is transmitted at least one time slot containing a common channel (FCCH, SCH, BCCH, CCCH), with a predetermined reference power. Then, other time slots are transmitted with a transmission power lower than the reference power, and using frequency hopping. In accordance with the invention at least one other time slot determined by the transmission power sequence is transmitted with the reference power, using frequency hopping.

20 Claims, 4 Drawing Sheets

| Multiframe Number | 0 | 1 | 2 | 3 | 4 | 5 | 6 | 7 |
|---|---|---|---|---|---|---|---|---|
| 50 |  | TCH | *TCH* | TCH | *TCH* | TCH | TCH | TCH |
| 49 | CCCH | *TCH* | TCH | *TCH* | TCH | TCH | TCH | TCH |
| ... | ... | ... | ... | ... | ... | ... | ... | ... |
| 32 | CCCH | TCH | TCH | TCH | TCH | *TCH* | TCH | *TCH* |
| 31 | SCH | TCH | TCH | TCH | *TCH* | TCH | *TCH* | TCH |
| 30 | FCCH | TCH | TCH | *TCH* | TCH | *TCH* | TCH | TCH |
| 29 | CCCH | TCH | *TCH* | TCH | *TCH* | TCH | TCH | TCH |
| 28 | CCCH | *TCH* | TCH | *TCH* | TCH | TCH | TCH | TCH |
| 27 | CCCH | TCH | *TCH* | TCH | TCH | TCH | TCH | *TCH* |
| 26 | CCCH | *TCH* | TCH | TCH | TCH | TCH | *TCH* | TCH |
| 25 | CCCH | TCH | TCH | TCH | TCH | *TCH* | TCH | *TCH* |
| 24 | CCCH | TCH | TCH | TCH | *TCH* | TCH | *TCH* | TCH |
| 23 | CCCH | TCH | TCH | *TCH* | TCH | *TCH* | TCH | TCH |
| 22 | CCCH | TCH | *TCH* | TCH | *TCH* | TCH | TCH | TCH |
| 21 | SCH | *TCH* | TCH | *TCH* | TCH | TCH | TCH | TCH |
| 20 | FCCH | TCH | *TCH* | TCH | TCH | TCH | TCH | *TCH* |
| 19 | CCCH | *TCH* | TCH | TCH | TCH | TCH | *TCH* | TCH |
| 18 | CCCH | TCH | TCH | TCH | TCH | *TCH* | TCH | *TCH* |
| 17 | CCCH | TCH | TCH | TCH | *TCH* | TCH | *TCH* | TCH |
| 16 | CCCH | TCH | TCH | *TCH* | TCH | *TCH* | TCH | TCH |
| 15 | CCCH | TCH | *TCH* | TCH | *TCH* | TCH | TCH | TCH |
| 14 | CCCH | *TCH* | TCH | *TCH* | TCH | TCH | TCH | TCH |
| 13 | CCCH | TCH | *TCH* | TCH | TCH | TCH | TCH | *TCH* |
| 12 | CCCH | *TCH* | TCH | TCH | TCH | TCH | *TCH* | TCH |
| 11 | SCH | TCH | TCH | TCH | TCH | *TCH* | TCH | *TCH* |
| 10 | FCCH | TCH | TCH | TCH | *TCH* | TCH | *TCH* | TCH |
| 9 | CCCH | TCH | TCH | *TCH* | TCH | *TCH* | TCH | TCH |
| 8 | CCCH | TCH | *TCH* | TCH | *TCH* | TCH | TCH | TCH |
| 7 | CCCH | *TCH* | TCH | *TCH* | TCH | TCH | TCH | TCH |
| 6 | CCCH | TCH | *TCH* | TCH | TCH | TCH | TCH | *TCH* |
| 5 | BCCH | *TCH* | TCH | TCH | TCH | TCH | *TCH* | TCH |
| 4 | BCCH | TCH | TCH | TCH | TCH | *TCH* | TCH | *TCH* |
| 3 | BCCH | TCH | TCH | TCH | *TCH* | TCH | *TCH* | TCH |
| 2 | BCCH | TCH | TCH | *TCH* | TCH | *TCH* | TCH | TCH |
| 1 | SCH | TCH | *TCH* | TCH | *TCH* | TCH | TCH | TCH |
| 0 | FCCH | *TCH* | *TCH* | *TCH* | *TCH* | TCH | TCH | TCH |

Slot Number of the TDMA-Frame

Fig 2

METHOD OF GENERATING A CARRIER WAVE OF COMMON CHANNELS, AND A RADIO SYSTEM

FIELD OF THE INVENTION

The invention relates to a method of generating a carrier wave of common channels by adjusting transmission powers of time slots and by using frequency hopping in a radio system, the radio system comprising a network part, at least one subscriber terminal and a bidirectional transmission path between the network part and the subscriber terminal, and the network part comprising at least one base station, and the bidirectional transmission path consisting of frames to be transmitted on the carrier wave frequency, the frame comprising time slots to which time slot a channel is applied, the channel being either a common channel or a dedicated channel, and the method comprising the steps of transmitting at least one time slot containing a common channel with a predetermined reference power without frequency hopping, transmitting other time slots with a transmission power lower than the predetermined reference power, using frequency hopping.

DESCRIPTION OF THE PRIOR ART

In radio systems each base station has one carrier wave that is called a carrier wave of common channels. The name control channel can also be used. In fact, this term refers to a plurality of channels which a subscriber terminal and a base station need for the control of their own operation. In addition to these, on the same carrier wave frequency are transmitted the proper dedicated traffic channels, along which user payload, such as speech or data, is transmitted after the establishment of a connection. Within dedicated channels, too, signalling information can be transferred, if necessary.

The term channel is used in two senses that differ from one another. In the present description, a channel means a logical channel which contains some characteristic information. In the other sense a channel means a physical channel which is used for transferring the logical channel. In the present description, the term time slot is used for the physical channel.

In the GSM system one physical channel is one time slot of a TDMA (Time Division Multiple Access) frame. Logical channels are common channels or dedicated channels. A TDMA frame has eight time slots. A 26-multiframe, measuring 26 TDMA frames, is defined for dedicated channels, in this case the time slots 1 to 7 of the TDMA frame are used. Correspondingly, a 51-multiframe, measuring 51 TDMA time frames, is defined for common channels, in this case the time slot 0 of the TDMA frame is used.

Common channels comprise BCH channels (Broadcast Channel) and CCCH channels (Common Control Channel). BCH channels comprise FCCH channel (Frequency Correction Channel), SCH channel (Synchronization Channel) and BCCH channels (Broadcast Control Channel). CCCH channels comprise PCH channel (Paging Channel), AGCH channel (Access Grant Channel) and RACH channels (Random Access Channel). Dedicated channels comprise Traffic Channels and DCH channels (Dedicated Control Channel). DCH channels comprise SDCCH channel (Stand-alone Dedicated Control Channel), SACCH channel (Slow Associated Control Channel) and FACCH (Fast Associated Control Channel).

The common channels are relevant to the present invention. In the downlink direction are FCCH channel, SCH channel, BCCH channels and CCCH channels (PCH channel and AGCH channel). The FCCH channel comprises frequency correction information for a subscriber terminal. The SCH channel comprises frame synchronizing information. The BCCH channel comprises general basestation-specific information. Of the CCCH channels the PCH channels comprises call information and the AGCH channel comprises information on traffic channel allocation to a subscriber terminal. In the uplink direction is a RACH channel. The RACH channel comprises a request of a subscriber terminal to employ an SDCCH channel, in order that a subscriber terminal could, for instance, reply to a call or establish a call.

Frequency hopping was developed for military radio systems to make unauthorized reception difficult and to prevent interference. In interference prevention the important thing is that frequency hopping provides frequency diversity and interferer diversity. Frequency hopping is implemented in such a way that a transmitter sends a specific amount of information on a specific frequency. Then the transmitter continues sending radio information on some other frequency. This frequency change can be performed several times. In general, the frequency change is repeated as a known sequence, and this is called a frequency hopping sequence.

The carrier wave of common channels is transmitted with full power and at the same frequency, which means that frequency hopping cannot be utilized with it. This causes problems in the planning and use of a radio system.

A major problem is that, in a sense, network planning needs to be duplicated. Firstly is planned the use of normal carrier waves, which use can be enhanced by frequency hopping, discontinuous transmission and power control. Secondly is planned the use of the carrier waves of common channels.

Another major problem arises from the fact that the capacity of the system decreases when dedicated channels on the same carrier wave with common channels cannot utilize frequency hopping, discontinuous transmission and power control.

BRIEF DESCRIPTION OF THE INVENTION

The aim of the present invention is to provide a method of generating a carrier wave of common channels, by which carrier wave the described problems can be avoided.

This is achieved with a method set forth in the preamble, which is characterized in that the method further comprises the step of transmitting at least one other time slot, determined by the transmission power sequence, with a predetermined reference power by using frequency hopping.

The invention further relates to a system for generating a carrier wave of common channels by adjusting the transmission powers of time slots and by using frequency hopping in a radio system, the radio system comprising a network part, at least one subscriber terminal and a bidirectional transmission path between the network part and the subscriber terminal, and the network part comprising at least one base station, and the bidirectional transmission path consisting of frames to be transmitted on the carrier wave frequency, the frame comprising time slots, and to which time slot a channel is applied, the channel being either a common channel or a dedicated channel, and the network part is arranged to transmit at least one time slot, containing a common channel, with a predetermined reference power without frequency hopping, to transmit other time slots with a transmission power lower than the predetermined reference power by using frequency hopping.

The system is characterized in that the network part is arranged to transmit at least one other time slot, determined by the transmission power sequence, with the predetermined reference power by using frequency hopping.

Several significant advantages are achieved with the method of the invention. The capacity of the dedicated channels on the carrier wave of the common channels improves significantly, since frequency hopping can be used. For common channels power control and discontinuous transmission can be used. Network planning becomes much easier, since the common frequency planning can be done for all carrier waves. The power measuring of a neighbouring base station, performed by a subscriber terminal, becomes more secure, since it can be performed during at least two different time slots. A very significant advantage is achieved, by the fact that the method of the invention is applicable with slight changes to the present GSM system, in case the power of the carrier wave is not reduced too much, i.e. less than about 10 dB.

The system according to the invention has the same advantages as those described above in relation to the method. The preferred embodiments of the invention and other more detailed embodiments enhance the advantages of the invention. It is obvious that the preferred embodiments and the detailed embodiments can be combined with one another to provide various combinations in order to achieve the desired technical efficiency.

DESCRIPTION OF THE DRAWINGS

In the following the invention will be described in greater detail with reference to the examples in accordance with the attached drawings, in which FIG. 2 illustrates an example of the implementation of the method in the GSM system.

DESCRIPTION OF THE PREFERRED EMBODIMENTS

The present invention is applicable to all radio systems in which frequency hopping can be used. In the example, the implementation of the invention is examined in a narrowband TDMA system, for instance in the GSM system, without restricting the invention thereto, however. Thus the invention may be used, for instance in the CDMA system, TDMA/CDMA hybrid system, and the broadband TDMA system in which a TDMA frame may be divided into as many as 16 time slots, each of which is further divided into 4 smaller time slots. Most advantageously, the radio system is synchronic, which means that the transmissions of the base stations take place essentially at the same moments.

Figure 1:
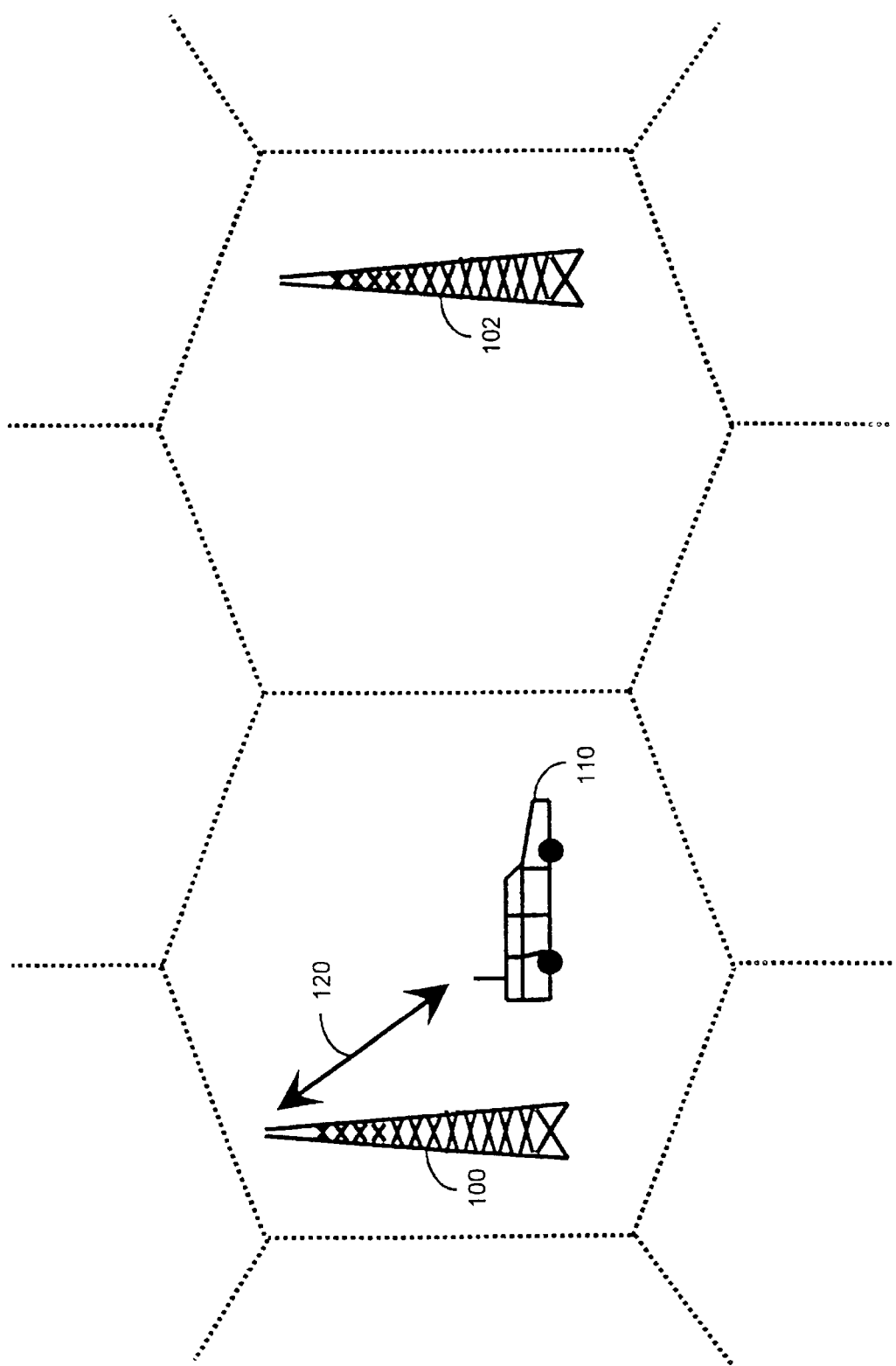
FIG. 1 illustrates a radio system.

FIG. 1 is examined. The radio system comprises a network part and a subscriber terminal 110. In this figure, the network part is represented by a base station 100, 102. The network part further comprises, for instance a base station controller and a mobile telephone exchange, but they are not described herein, since the simplification presented makes the examination of the invention easier. Between the network part 110 and the subscriber terminal there is a bidirectional transmission path 120, in practice implemented with a radio connection. In the radio connection user information and signalling information are transmitted in a frame structure. A frame comprises time slots. To a time slot is applied a channel.

Figure 3:
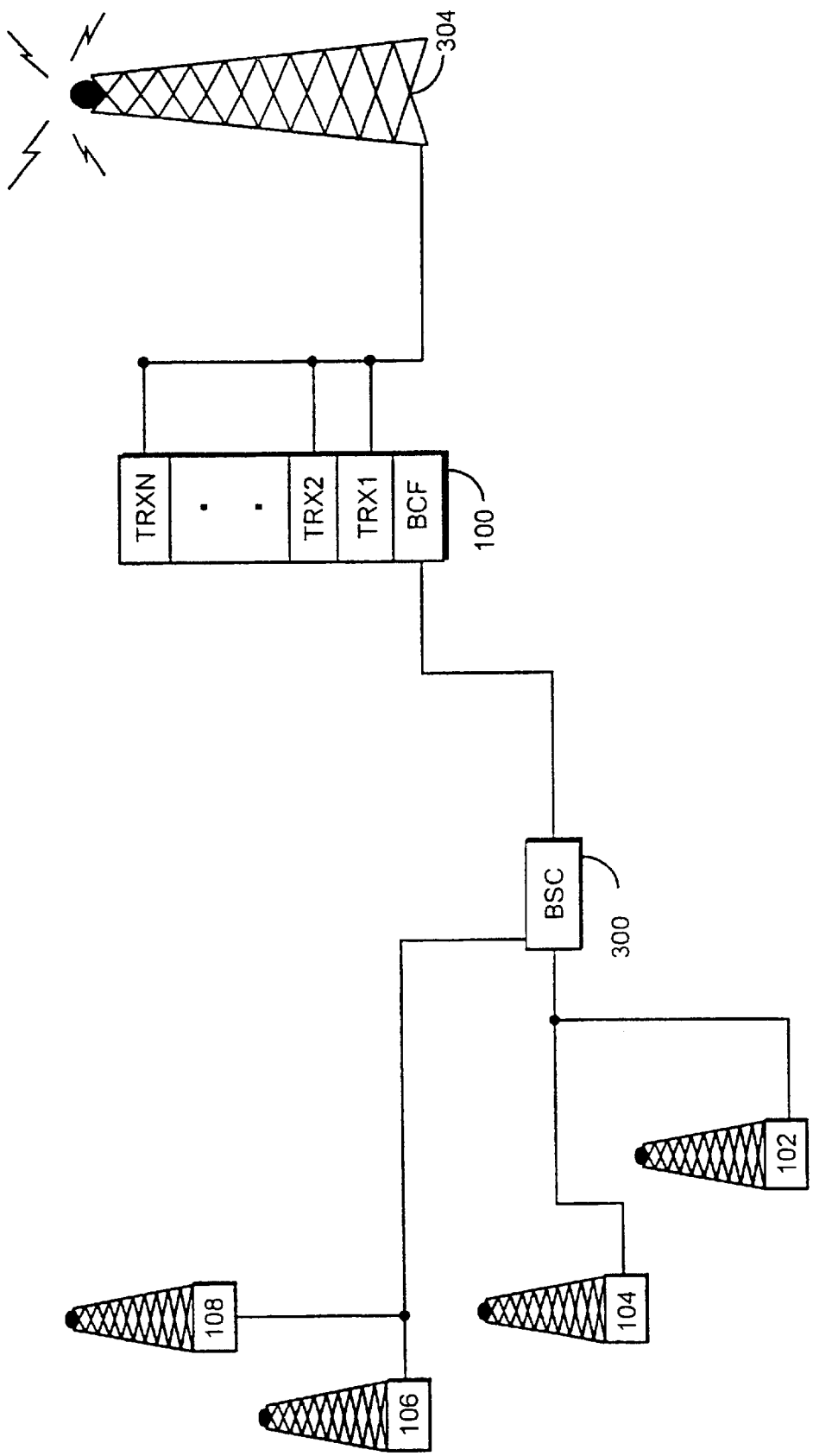
FIG. 3 illustrates a structure of a base station.

The structure of a base station 100 is illustrated in FIG. 3. FIG. 3 comprises only sections that are relevant to the description of the invention, but it is obvious to one skilled in the art that a conventional base station also comprises other functions and structures, whose description in greater detail is not necessary herein. The base station may be, for instance, of the base station type used in the GSM system, which base station, however, comprises the changes required by the invention. The base station 100 comprises a base station control function BCF (Base Station Control Function) which controls locally the operation of the entire base station 100. On the other hand, a plurality of base stations 100, 102, 104, 106, 108 are controlled in a centralized manner by a base station controller (BSC=Base Station Controller) 300 that is in connection with the base stations. The transceivers TRX1 to TRXN are the object of the local control of the base station 100. Typically, the base station 100 comprises one to sixteen transceivers TRX1, TRX2, TRX3, . . . , TRX16, each of which has a connection to an antenna unit 304. One transceiver TRX1 to TRXN offers a radio capacity to one TDMA frame, that is to say typically to eight time slots.

Figure 4:
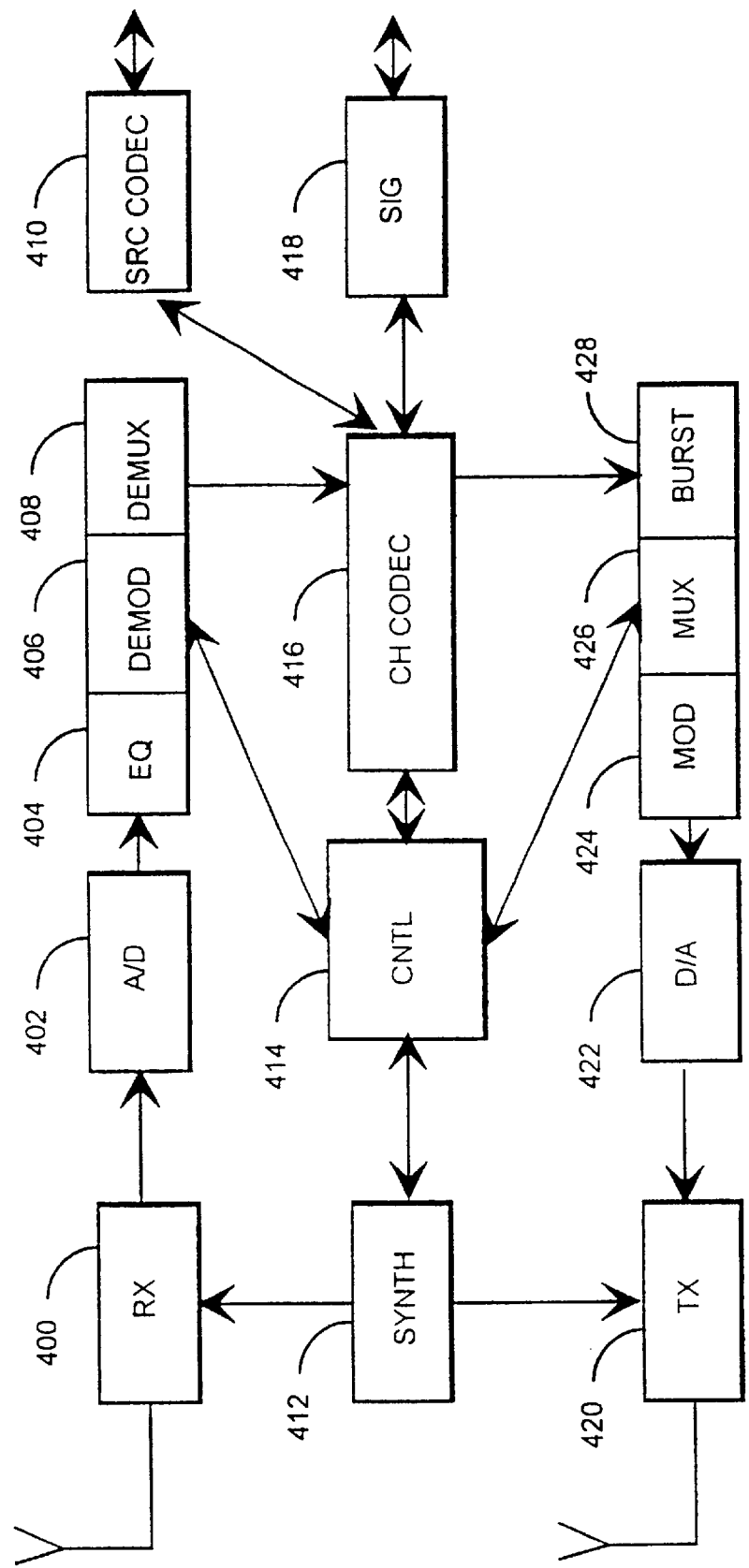
FIG. 4 illustrates a structure of one transceiver.

FIG. 4 illustrates in greater detail the structure of one transceiver TRX1. The receiver 400 comprises a filter which eliminates frequencies outside the desired frequency band. Thereafter the signal is converted into an intermediate frequency or directly onto the baseband, in which form the signal is sampled and quantized in an analogue-to-digital converter 402. An equalizer 404 compensates for interference, for instance interference caused by multipath propagation. A demodulator 406 takes from the equalized signal the bit stream which is applied to a demultiplexer 408. The demultiplexer 408 separates the bit stream from different time slots into specific logical channels. A channel codec 416 decodes the bit stream of different logical channels, in other words it decides whether the bit stream is signalling information to be applied to a signalling unit 418, or whether the bit stream is speech to be applied to a speech codec 410. The channel codec 416 also performs error correction. The source codec 410 performs in the base station decoding of received data, for instance, of a picture or of speech, and correspondingly, encoding of data to be transmitted. Encoding and decoding are thus conversion of data, containing for instance speech, from 64 kbit/s of a fixed network format into some other format (for instance 13 kbit/s) of a cellular radio network and vice versa. A signalling unit 418 deals with signalling information between the network and the subscriber terminal. A control unit 414 performs internal control tasks by controlling different units. A burst former 428 adds a training sequence and tail bits to data coming out of the channel codec 416. A multiplexer 426 designates a time slot for each burst. A modulator 424 modulates digital signals onto a carrier wave of a radio frequency. This function is analogue in nature, so its performance requires a digital-to-analogue converter 422. A transmitter 420 comprises a filter, by which the bandwidth is limited. Moreover, the transmitter 420 controls the output power of the transmission. A synthesizer 412 arranges necessary frequencies for different units. A clock included in the synthesizer 412 may be locally controlled or it may be controlled in a centralized manner from somewhere else, for instance, from a base station controller. The synthesizer 412 generates the required frequencies, for instance, with a voltage-controlled oscillator.

Frequency hopping used in the base station 100 can be implemented in two ways: as baseband hopping or synthesizer hopping. In case the base station 100 has a plurality of transceivers TRX1 to TRXN, each time slot is applied to a transceiver TRX1 to TRXN operating on a specific baseband, in accordance with a frequency hopping sequence. In case the base station has, for instance only one transceiver TRX1, and if frequency hopping is desired to be implemented, both the synthesizer 412 and the transmitter 420 must be directed to different frequencies for sending each time slot on the frequency in accordance with the frequency hopping sequence.

The base station 100 is arranged to transmit downlink the common control channels using at least one time slot of a TDMA frame. The transmission is performed with a predetermined reference power without frequency hopping, in order to make the measurement of a neighbouring base station possible. Other time slots are transmitted with a power lower than the predetermined reference power, using frequency hopping.

The predetermined reference power is either determined in the system specifications of the radio system, or it is indicated in the system parameters of the radio system. Typically, the reference power is the highest power used in the radio system.

The base stations 100 to 108 have a cell each, i.e. a theoretical coverage area illustrated in FIG. 1 as a hexagonal area. Each base station 100 to 108 transmits the common control channels downlink, i.e. from the base station 100 in the direction of the subscriber terminal 110. The subscriber terminal 110 measures the power of the common control channels it receives, of its own radio connection 120 to the base station 100 the subscriber terminal 110 can measure the quality without having to measure the common control channels of the base station 100 of the serving cell. The information measured of the dedicated radio connection 120 has to be made comparable with the information measured of the common control channels of the adjacent cells, also the differences in power levels must be considered. If the subscriber terminal 110 is not in the call mode, then the subscriber terminal 110 also listens to the common control channels of the dedicated cell and simultaneously measures their power which is in direct proportion to the power of the common control channels of the adjacent cells. The subscriber terminal 110 reports the averaged measuring results of the best neighbouring base stations to the base station 100, and the base station system (most likely the base station controller 300) makes the decision on the handover mainly on the basis of these results.

If only one time slot in a TDMA frame is transmitted with the predetermined reference power, the measurements of the neighbouring cell performed in preparation for the handover may slow down. This results from the fact that the subscriber terminal 110 itself may be transmitting/receiving, when it should be performing the measurement of the neighbouring base station, of the time slot of the common channels transmitted by the neighbouring base station at that very moment. Likewise, the initial synchronizing of a call is more uncertain.

In accordance with the invention, the base station 100 is arranged to transmit at least one other time slot of a TDMA frame with a predetermined reference power using frequency hopping. In a described base station this can be implemented, for instance, in such a way that the base station control function BCF directs the common control channels, for instance to the first transceiver TRX1. In the transceiver TRX1 in question, the control unit 414 controls the transmitter 420 to send the measuring time slot in question always with the same reference transmission power. Likewise, the transmitter 420 of the transceiver of the second time slot to be transmitted with the reference power, is controlled to use reference power. Typically, the base station control function BCF and the control unit 414 of the transceiver TRX1 are implemented by signal-processing or general processors. Then the functions required by the invention are advantageously implemented as software. The implementation may also be carried out, for instance with separate logic or an ASIC circuit, or with some other HW based solution. However, the basic principle of the invention remains the same.

FIG. 2 is examined. Horizontally are described time slots 0 to 7 of a TDMA frame. Vertically is indicated time, in other words there are the frames, numbers 0 to 50, of a 51-multiframe. Common channels FCCH, SCH, BCCH, CCCH are applied, each in its turn, to the time slot 0 of the TDMA frame. To the time slots 1 to 7 are applied the dedicated channels TCH. The carrier wave of common channels is generated as follows:

At least one time slot containing a common channel is transmitted with a predetermined reference power without frequency hopping. In other words, in this example in the time slot 0, common channels FCCH, SCH, BCCH, CCCH in the frame numbers 0 to 50 of the 51-multiframe are transmitted with the reference power. The use of reference power is illustrated in the figure by printing in bold type the channel to be sent with the reference power.

Other time slots are transmitted with a transmission power lower than the reference power, by using frequency hopping. In other words, in this example the time slots in unbold print are transmitted, for instance, with a 1 to 10 dB lower transmission power, so for instance, the time slot numbers 2, 4, 5, 6 and 7 of the frame 0, the time slot numbers 1, 3, 5, 6 and 7 of the frame 1, etc.

In addition to the above two steps in accordance with the invention a third step is carried out:

At least one other time slot determined by the transmission power sequence is transmitted with the reference power, using frequency hopping. In other words, in this example two time slots of each TDMA frame are transmitted with the reference power. The channels to be sent with the reference power are again indicated in bold print in the figure, so for instance, the time slots 1 and 3 in the frame 0 are transmitted with the reference power, the time slots 2 and 4 in the frame 1, etc.

Frequency hopping is not described in the figure, since frequency hopping is implemented in accordance with the prior art: the time slot 0 does not perform frequency hopping. Other time slots 1 to 7 perform frequency hopping, for instance in such a way that each time slot performs frequency hopping in accordance with its own frequency hopping sequence. If the base station 100 sends n carrier waves on different frequencies, then the length of the frequency hopping sequence of the carrier wave, containing the common channels, is n minus 1. Consequently, the length of the frequency hopping sequence of other carrier waves is n.

In the example the sequence according to which full power transmission is transferred cyclically from one time slot into another is called a transmission power sequence.

The transmission power sequence can also be implemented in such a way that a transmission power sequence is transferred from one time slot into another in accordance with a predetermined pseudo random sequence.

The neighbouring base stations 100, 102 use a different transmission power sequence or the same transmission power sequence shifted from one another according to the transmission moment, in order to improve the capacity of the system. Hence the interference caused by the neighbouring base stations 100, 102 to one another is minimized.

The method enables time slots containing other than common channels to utilize discontinuous transmission and/or power control. This further improves the capacity of the system.

To improve the power measurement of the base station of the neighbouring cell, performed by the subscriber terminal 110, the time slot to be transmitted with the reference power is marked with a flag bit. Further, improvement can be achieved by indicating the average transmission power of the carrier wave of common channels of the base station in the system information and/or on some common channel. The transmission power sequence of the base station is also indicated in the system information and/or on some common channel.

In the CDMA system or the TDMN/CDMA hybrid system, time slots to be transmitted with a predetermined reference power are encoded with a predetermined spreading code.

Even though the invention has been described in the above with reference to an example in accordance with the attached drawings, it is obvious that the invention is not restricted thereto, but it can be modified in a variety of ways within the scope of the inventive idea disclosed in the appended claims.

What is claimed is:

1. A method of generating a carrier wave of common channels by adjusting transmission powers of time slots and by using frequency hopping in a radio system, the radio system comprising a network part, at least one subscriber terminal and a bidirectional transmission path between the network part and the subscriber terminal, and the network part comprising at least one base station, and the bidirectional transmission path consisting of frames to be transmitted on the carrier wave frequency, the frame comprising time slots to which a channel is applied, the channel being either a common channel or a dedicated channel, and the method comprising:

transmitting at least one time slot containing a common channel with a predetermined reference power without using frequency hopping, transmitting other time slots with a transmission power lower than the predetermined reference power, using frequency hopping, and transmitting at least one other time slot with the predetermined reference power by using frequency hopping.

2. The method as claimed in claim 1, wherein a transmission power sequence is transferred cyclically from one time slot into another.

3. The method as claimed in claim 1, wherein a transmission power sequence is transferred from one time slot into another in accordance with a predetermined pseudo random sequence.

4. The method as claimed in claim 1, wherein neighbouring base stations use a different transmission power sequence or the same transmission power sequence shifted from one another according to a transmission moment.

5. The method as claimed in claim 1, wherein time slots containing other than common channels utilize discontinuous transmission and power control.

6. The method as claimed in claim 1, wherein the base station sends n carrier waves, and the length of a frequency hopping sequence of the carrier wave containing common channels is n minus 1, the length of the frequency hopping sequence of other carrier waves is n.

7. The method as claimed in claim 1, wherein the time slot to be transmitted with the reference power is marked with a flag bit.

8. The method as claimed in claim 1, wherein an average transmission power of the carrier wave of common channels of the base station is indicated in system information and on some common channel.

9. The method as claimed in claim 1, wherein a transmission power sequence of the base station is indicated in system information and on some common channel.

10. The method as claimed in claim 1, wherein time slots to be transmitted with a predetermined reference power are encoded with a predetermined spreading code.

11. A system of generating a carrier wave of common channels by adjusting the transmission powers of time slots and by using frequency hopping in a radio system, the radio system comprising a network part, at least one subscriber terminal and a bidirectional transmission path between the network part and the subscriber terminal, and the network part comprising at least one base station, and the bidirectional transmission path consisting of frames to be sent with carrier wave frequency, the frame comprising time slots, and to which time slot a channel is applied, the channel being either a common channel or a dedicated channel, and the network part is arranged to:

transmit at least one time slot containing a common channel with a predetermined reference power without frequency hopping, transmit other time slots with a transmission power lower than the predetermined reference power, using frequency hopping, and transmit at least one other time slot predetermined by the transmission power sequence with the predetermined reference power, using frequency hopping.

12. The system as claimed in claim 11, wherein the network part transfers a transmission power sequence cyclically from one time slot into another.

13. The system as claimed in claim 11, wherein the network part transfers a transmission power sequence from one time slot into another in accordance with a predetermined pseudo random sequence.

14. The system as claimed in claim 11, wherein neighbouring base stations use a different transmission sequence or the same transmission power sequence shifted from one another according to a transmission moment.

15. The system as claimed in claim 11, wherein the network part determines that time slots containing other than common channels utilize discontinuous transmission and power control.

16. The system as claimed in claim 11, wherein the base station transmits n carrier waves, and a length of a frequency hopping sequence of the carrier wave containing common channels is n minus 1, and the length of the frequency hopping sequence of other carrier waves is n.

17. The system as claimed in claim 11, wherein the network part marks with a flag bit the time slot to be transmitted with the reference power.

18. The system as claimed in claim 11, wherein the network part indicates an average transmission power of the carrier wave of common channels of the base station in the system information and on some common channel.

19. The system as claimed in claim 11, wherein the network part is arranged to indicate a transmission power sequence of the base station in system information and on some common channel.

20. The system as claimed in claim 11, wherein the network part is arranged to encode time slots to be sent with a predetermined reference power with a predetermined spreading code.

* * * * *

UNITED STATES PATENT AND TRADEMARK OFFICE
CERTIFICATE OF CORRECTION

PATENT NO.    : 6,366,602 B1
DATED         : April 2, 2002
INVENTOR(S)   : Raitola It is certified that error appears in the above-identified patent and that said Letters Patent is hereby corrected as shown below:

<u>Title page,</u>
Item [30], please insert the Foreign Application Priority Data, as follows:
-- [30]   Foreign Application Priority Data
    December 4, 1996    (Fl)    964859 --

Signed and Sealed this

Seventeenth Day of February, 2004

JON W. DUDAS
*Acting Director of the United States Patent and Trademark Office*